June 28, 1949.　　　　C. E. LAUE　　　　2,474,430
VALVE
Filed June 23, 1945
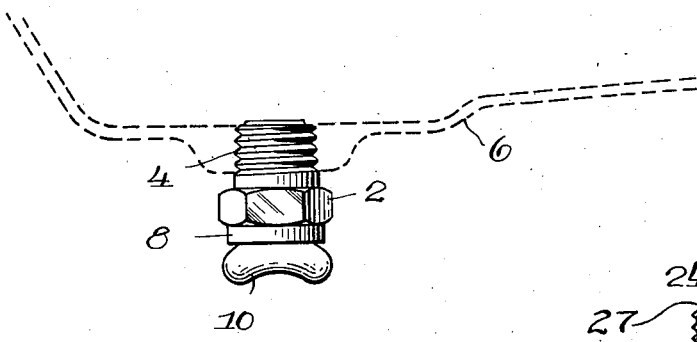
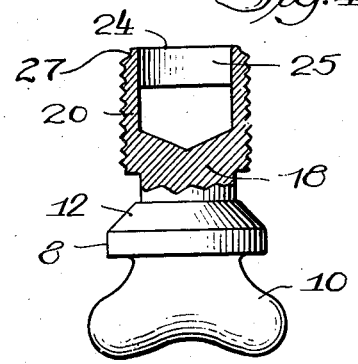
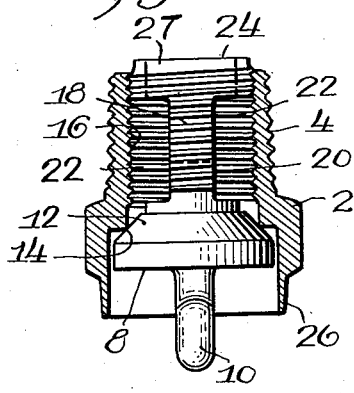
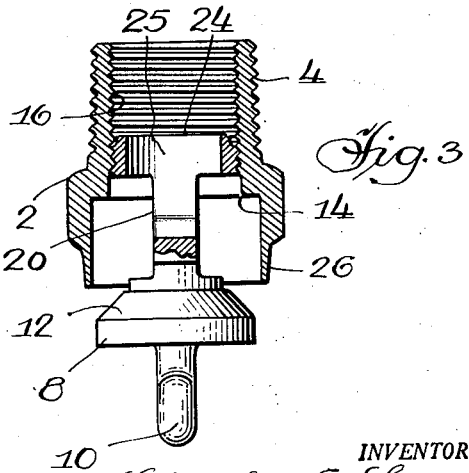
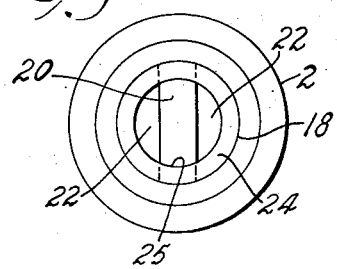
INVENTOR.
Charles E. Laue
BY
Herbert J. Schmid
Atty.

Patented June 28, 1949

2,474,430

UNITED STATES PATENT OFFICE 2,474,430

VALVE

Charles E. Laue, Chicago, Ill.

Application June 23, 1945, Serial No. 601,238

1 Claim. (Cl. 137—34)

This invention relates to valves and more particularly to drain valves of the type wherein a plug is threaded into an opening through a valve body.

It has been discovered that by providing a plug with a head at its outer end and a threaded shank with the threads interrupted or mutilated to define flow passages at opposite sides of the shank a flow rate may be obtained which is approximately thirty percent faster than that which may be obtained in any other drain valve of comparable dimensions. Such a valve is disclosed and claimed in my U. S. Letters Patent No. 2,374,690, issued May 1, 1945, by the United States Patent Office.

Under certain conditions, however, a valve such as that above-described may become jammed, inasmuch as the operator may insert the plug angularly into the threaded opening of the body, whereby the threads on the plug and body are mismated, and it is an object of the present invention to provide guide means on the plug in the form of lead threads to prevent mismating of the threads on the plug and body, without appreciably diminishing the rapid flow rate of the valve.

A more specific object of the invention is to provide a novel drain valve plug such as above-described, wherein the shank threads are interrupted for the major portion of the length of the plug shank, said threads being uninterrupted for a limited extent at the inner end of the shank. An axial flow passage is provided through the shank to afford communication with the flow passages at opposite sides of the mutilated or non-cylindrical portion of the shank.

Another object of the invention is to provide a skirt or baffle on the outer end of the body to prevent radial deflection of the draining liquid as it washes the plug head which cooperates with the outer end of the body passage to close the latter when the plug is actuated to its closed position.

In the drawings:

Fig. 1 is a side elevation of the novel valve applied to an associated container which is indicated in dotted lines;

Fig. 2 is a longitudinal sectional view through the valve, with the plug shown in elevation and in the closed position thereof;

Fig. 3 is a view comparable to Fig. 2, with the plug shown partly in section and in its fully open position; and Fig. 4 is a side elevation of the plug with a portion thereof broken away to more clearly illustrate the construction thereof, and Figure 5 is a plan view taken from the top of Figure 2.

Describing the invention in detail, the body 2 is preferably provided with external threads 4 for cooperation with a threaded opening in an associated container 6 (Fig. 1), although it will be understood that, if desired, the body may be an integral part of said container.

The plug 8 comprises a handle 10 on its outer end and a head 12 for cooperation with a seat 14 on the body to close the threaded drain opening 16 therethrough.

The shank 18 of the plug is preferable threaded from end to end thereof for cooperation with the threads of the opening 16, and the shank threads are mutilated or interrupted for a major portion of the length of the shank to define a noncylindrical or flat portion 20 defining with the opening 16 flow passages 22 (Fig. 2). At its inner end the shank threads are uninterrupted for a limited extent to afford a hollow cylindrical portion 24 having an internal flow passage 25 and external lead threads for cooperation with the threads of the opening 16. Thus it will be understood that the lead threads on the portion 24 prevent mismating of the threads on the plug shank 18 and the body 2, as might occur if the shank threads were interrupted from end to end thereof. At the inner end of the portion 24 there is preferably provided an unthreaded portion 27 adapted to slidably engage the threads of the passage 16 to center the plug shank axially thereof as the shank is inserted into said passage, thereby affording additional prevention of mismating between the threads on the plug shank and the body member 2.

It may be noted that when the plug stem or shank is in its open position to permit drainage of fluid through the passage 16, the fluid washes across the head 12 thus removing dirt and foreign matter therefrom to ensure a positive shut-off when the plug is actuated to its closed position. As the fluid strikes head 12, the fluid is deflected radially outwardly therefrom, and a skirt or baffle flange 26 is preferably provided on the body 2 to prevent the deflecting fluid from spattering the operator or adjacent mechanism. If this protection afforded by the flange 26 is not desired, it may be eliminated or the plug may be actuated to the extreme open position thereof illustrated in Fig. 3.

Furthermore, it may be noted that either the cylindrical guide portion 24 or the noncylindrical portion 20 of the plug may be unthreaded although it is preferred to have both portions threaded, as illustrated in the drawings. If the portion 24 is unthreaded, the outer diameter thereof must be slightly smaller than the diameter of the passage 16 to accommodate a sliding fit therein, such as the fit of the portion 27 within the passage 16.

It is to be understood that I do not wish to be limited by the exact embodiment of the device shown which is merely by way of illustration and not limitation as various and other forms of the device will be apparent to those skilled in the art without departing from the spirit of the invention or the scope of the claim.

I claim:

A drain valve comprising a member with a drain opening having threads therein and a seat at the outer end of said opening, and a plug having a head engageable with the seat to close said opening, said plug having a threaded shank, the threads of said shank being adapted to engage those of said opening and being interrupted to define spaced portions threaded on their remote surfaces and constituting the major longitudinal segment of said shank, said shank including a cylindrical guide portion connected to the end of said first-mentioned portions remote from said head and adapted to prevent mismating of the threads on said first-mentioned portions with those of said opening, said first-mentioned portions defining a pair of flow passages in said opening, and said cylindrical portion having an axial flow passage extending therethrough and communicating with the space between the first-mentioned portions, said axial passage communicating with both passages of said pair.

CHARLES E. LAUE.

REFERENCES CITED

The following references are of record in the file of this patent:

UNITED STATES PATENTS

| Number | Name | Date |
| --- | --- | --- |
| 673,756 | Burke | May 7, 1901 |
| 984,082 | Edgerton | Feb. 14, 1911 |
| 1,519,231 | Benjamin | Dec. 16, 1924 |
| 1,565,913 | Dosker | Dec. 15, 1925 |
| 2,001,610 | Hildenbrand | May 14, 1935 |
| 2,156,800 | Bucknell | May 2, 1939 |
| 2,374,690 | Laue | May 1, 1945 |